(12) United States Patent
Kitamura et al.

(10) Patent No.: US 11,774,942 B2
(45) Date of Patent: Oct. 3, 2023

(54) MACHINE TOOL OPERATION SYSTEM AND MACHINE TOOL OPERATION METHOD CARRIED OUT BY SAID SYSTEM

(71) Applicant: KITAMURA MACHINERY CO., LTD., Toyama (JP)

(72) Inventors: Akihiro Kitamura, Toyama (JP); Kosaku Kitamura, Toyama (JP); Seiji Amaike, Toyama (JP)

(73) Assignee: KITAMURA MACHINERY CO., LTD., Takaoka (JP)

( * ) Notice: Subject to any disclaimer, the term of this patent is extended or adjusted under 35 U.S.C. 154(b) by 485 days.

(21) Appl. No.: 16/977,488

(22) PCT Filed: Oct. 10, 2019

(86) PCT No.: PCT/JP2019/040104
§ 371 (c)(1),
(2) Date: Sep. 2, 2020

(87) PCT Pub. No.: WO2020/085109
PCT Pub. Date: Apr. 30, 2020

(65) Prior Publication Data
US 2021/0003991 A1    Jan. 7, 2021

(30) Foreign Application Priority Data
Oct. 26, 2018   (JP) .................................. 2018-201984

(51) Int. Cl.
*G05B 19/409* (2006.01)
(52) U.S. Cl.
CPC .. *G05B 19/409* (2013.01); *G05B 2219/32002* (2013.01); *G05B 2219/33192* (2013.01)
(58) Field of Classification Search
CPC ........ G05B 19/409; G05B 2219/32002; G05B 2219/33192; Y02P 70/10
See application file for complete search history.

(56) References Cited

U.S. PATENT DOCUMENTS

| | | | | |
|---|---|---|---|---|
| 2009/0171483 A1* | 7/2009 | Scheuermann | ...... | G05B 19/409 700/83 |
| 2012/0065767 A1* | 3/2012 | Oiwa | ................... | G05B 19/409 700/159 |

(Continued)

FOREIGN PATENT DOCUMENTS

| | | |
|---|---|---|
| EP | 1 548 549 A2 | 6/2005 |
| JP | 2000 315103 A | 11/2000 |

(Continued)

OTHER PUBLICATIONS

International Preliminary Report dated Apr. 27, 2021, issued in corresponding PCT/JP2019/040104.

(Continued)

*Primary Examiner* — Mohammad Ali
*Assistant Examiner* — Sheela Rao
(74) *Attorney, Agent, or Firm* — BACON & THOMAS, PLLC

(57) ABSTRACT

An object is to provide a machine tool operation system that enables inputs to an NC device of a machine tool by use of a tablet terminal from any location and an operation method using the system.
The machine tool operation system includes an NC device, a computer connected to the NC device, and a tablet terminal that is in wirelessly communication with the computer and enables inputs and outputs of signals for the NC device via the computer. The tablet terminal includes a display unit that make to display a menu screen on a display screen, an input unit that receives an input from a user, and an input processing unit that outputs an input signal transmitted to the computer based on the input. The computer includes a signal processing unit that outputs a command signal for a machine tool operation based on the input signal. A wireless communication unit to wirelessly send and receive signals (Continued)

between the tablet terminal and computer, and a transmission unit to transmit signals between the computer and NC device are provided.

7 Claims, 5 Drawing Sheets

(56) References Cited

U.S. PATENT DOCUMENTS

| | | |
|---|---|---|
| 2014/0074279 A1 | 3/2014 | West |
| 2015/0045916 A1* | 2/2015 | Yokomae ............. G05B 19/409 |
| | | 700/83 |
| 2015/0165277 A1 | 6/2015 | Ono et al. |
| 2016/0179085 A1* | 6/2016 | Seitz .................... G05B 19/414 |
| | | 700/180 |
| 2018/0136631 A1 | 5/2018 | Takahashi |
| 2019/0088170 A1* | 3/2019 | Atchison, Jr. ........... G09F 13/22 |

FOREIGN PATENT DOCUMENTS

| | | |
|---|---|---|
| JP | 2006 215630 A | 8/2006 |
| JP | 2013 105301 A | 5/2013 |
| JP | 2016-018255 A | 2/2016 |
| JP | 2018 092499 A | 6/2018 |
| KR | 2017-0047497 A | 5/2017 |

OTHER PUBLICATIONS

International Preliminary Report dated May 6, 2021, issued in corresponding PCT/JP2019/040104.
Search Report dated Nov. 27, 2019, issued in corresponding International Application No. PCT/JP2019/040104.
Search Report dated Jul. 29, 2021, issued in corresponding European application No. 19877215.4.
Office Action dated Feb. 9, 2023, issued in corresponding European application No. 19877215.4.

* cited by examiner

MACHINE TOOL OPERATION SYSTEM AND MACHINE TOOL OPERATION METHOD CARRIED OUT BY SAID SYSTEM

TECHNICAL FIELD

The present invention relates to a machine tool operation system to enable input operations to a numerical control (NC) device that is connected to a machine tool body and that executes numerical controls by use of a tablet terminal at any location and to a machine tool operation method using the operation system.

BACKGROUND ART

Recent machining centers achieve various machining operations according to various NC programs using numerical controls from a control panel having an NC function (hereinafter called an NC control panel) connected to a machine tool body.

Generally, in such an NC control panel, a display section is arranged on the upper side of the front surface of the control panel. And around and below the display section, a CF card slot, a USB port, a keyboard including a mouse pad and a mouse button, and many various keys such as switches, buttons, and dials related to driving operations are arranged.

NC programs, tool information, etc. for various machining operations are inputted into a storage section of an incorporated control section via this control panel. When an operator operates the NC control panel to call and execute a predetermined NC program, a machine tool body executes automatic machining operations according to the NC programs.

Various dials, buttons, switches, display lamps, etc. required for the driving operations of the machine tool body are arranged on the NC control panel. All automatic and manual operations of the machine tool can be executed while being confirmed on the display section (see Patent Literature 1).

As shown in FIG. 6, a specific configuration of the NC control panel currently used includes a touch panel liquid crystal display 101 provided to the upper area of the front surface of an NC control panel 100 as a display section, and a USB port 103 to input and output various data. A keyboard 110 including a mouse pad 108 and a mouse button 109 is arranged below the liquid crystal display 101.

An operation panel 102 on the area below the keyboard 110 arranges an operation preparation switch 104 that first powers up a control circuit of the NC control panel and starts a lubricant pump, an operation end switch 105 that stops the lubricant pump and powers OFF the control circuit of the control panel, an emergency stop switch 106 that stops each drive section, an automatic operation start switch 111 capable of starting a cycle start, and a feed hold switch 112 that stops the feeding under automatic operation. A mode change-over switch 122 is arranged to select automatic operation modes including various modes of an MDI operation, DNC operation, memory operation and edit, and manual operation modes including various modes of handle feed, jog feed and zero-return.

The operation panel 102 further arranges a jog feedrate setting switch 113, a rapid traverse override switch 114, a spindle speed override switch 115, and an operation door interlock release button 116. A jog feed (+) (−) direction switch 136 that feeds each of Y, Y, and Z axes in the plus or minus direction at a rate selected by the jog feedrate setting switch 113 in the manual operation mode, and a rapid traverse button 137 that enables each axis feed at a rate set by the rapid traverse override switch 114 are also arranged.

In addition, the area where various switches (123 to 130) to change-over the enable/disable program functions are arranged, the area where various switches (131 to 135) to change-over the enable/disable functions related to coolant are arranged, and the area where various switches (147 to 158) to change-over the enable/disable auxiliary functions are arranged, are provided. Various lamps such as a power lamp, alarm lamp, zero-return confirmation indication lamp, and mirror image lamp are also arranged. In many cases, a handy manual pulse generator 107 capable of wired or wireless communications is provided, in the handle mode of the manual operation modes, a step feed operation specified by an axis selection switch and magnification specifying switch is executed.

CITATION LIST

Patent Literature

[PTL 1]
JP2016-85702A

SUMMARY OF INVENTION

Technical Problem

An NC control panel is usually installed on a wall surface of a splash guard surrounding a machining field of a machine tool body. Most operations are executed at the installation location. It may be however preferable to execute actual various operations while confirming a machine status and an operational status. In this case, an operator needs to execute operations after confirming the status of certain sections of the machine tool and returning to the front of the NC control panel at the fixed location. Thus, in the past, the operations are difficult while confirming the machine status and operational status of the machine tool body at any location. This may be inefficient.

Thus, it had been considered to directly operate from any location using a tablet terminal in which programs necessary for input operation to an NC device for drive control of the machine tool is installed, without the inputs using an NC control panel. This however is unpractical since it exceeds the processing capability of the tablet terminal and cannot be used stably.

In view of the above problem, an object of the present invention is to provide a machine tool operation system that enables input to an NC device from any location by use of a tablet terminal and a machine tool operation method using the system.

Solution to the Problem

To achieve the above object, a machine tool operation system of the invention according to claim 1 includes an NC device connected to a machine tool body to perform numerical controls, a computer connected to the NC device, and a tablet terminal in wirelessly communication with the computer to enable input and output of signals to and from the NC device via the computer. The tablet terminal includes a display unit configured to display a menu screen showing selectable various operation modes for a machine tool that being previously provided to the NC device, on a display screen, an input unit to receive inputs of a user, and an input processing unit to output an input signal to be transmitted to the computer based on the input received by the input unit. The computer includes a signal processing unit to output a command signal for a machine tool operation to be transmitted to the NC device based on an input signal from the tablet terminal. A wireless communication unit to wirelessly send and receive signals between the tablet terminal and computer, and a transmission unit to transmit signals between the computer and NC device, are provided.

With the above configuration in the present invention, by performing the input to the tablet terminal, command signals can be transmitted to the NC device via the computer incorporated in the present operation system to operate the machine tool. Desired operations can be thus performed to the machine tool as with inputs on the operation panel of past NC control panels. The operation system using the fixed positioned NC control panel is therefore unnecessary. Operations of the machine tool are possible from any location even when remote from the machine tool while the actual status of the machine tool is confirmed using the tablet terminal.

The tablet terminal has a display unit that displays an image indicating an operational status of the machine tool on the display screen. The operational statuses of the machine tool can be confirmed using the tablet terminal as with the display of the past NC control panel.

As a configuration to display the image indicating the operational statuses of the machine tool on the display screen of the tablet terminal, the NC device may include software to transmit a status signal indicating the operational status of the machine tool to the computer via the transmission unit. The computer may include software that makes the signal processing unit output an image display signal based on the status signal transmitted from the NC device and wirelessly transmit the image display signal to the tablet terminal via the wireless communication unit. The tablet terminal may include software that makes the display unit display an image indicating the operational status of the machine tool on the display screen of the tablet terminal based on the image display signal wirelessly transmitted from the computer via the wireless communication unit.

In the past NC control panel, input operations are executed for various machine tool operations with various dials, switches, and buttons arranged on the mounted real operation panel. The display unit of the tablet terminal of the present invention displays an operation panel image where multiple operation buttons corresponding to various machine tool operation functions are arranged to enable input operations on the screen. Instead of the above real operation panel, this operation panel image is applicable.

To achieves a configuration that makes possible input operations on the operation panel image for machine tool operations with such a tablet terminal, the tablet terminal further includes software to make the display unit display on the display screen an operation panel image where multiple operation buttons are arranged corresponding to executions of at least some of various machine tool operation functions previously provided to the NC device. Additionally, the software makes the input unit output input signals corresponding to the operation buttons based on input operations that select the operation buttons of the operation panel image. The computer includes a storage section previously storing all command codes for the machine tool driving operations corresponding to all the operation buttons arranged on the operation panel image. The computer includes software having a function to make the signal processing unit read the command code of the corresponding machine tool operation from the storage section based on the input signal received via the wireless communication unit, and output the command code as a command signal to transmit to the NC device via the transmission unit.

As the input unit of the tablet terminal of the present invention, one having a touch panel is easy to use. An input method using the touch panel is capable of touching each operation mode of the machine tool on the menu screen and displaying an operational status of the machine tool at each mode. The input method is also capable of starting and displaying the operation panel image by touch operation from the menu screen. The operation buttons corresponding to each machine tool operation function are arranged on this operation panel image. The input operation is complete only by pushing the operation button corresponding to a desired operation function. With the touch panel, an input signal of the operation button previously which corresponded to the position signal detected by this touch operation is outputted and wirelessly transmitted to the computer.

Machine Tool Operation Method

An operation method using the operation panel image of the above machine tool operation system is executed in the following steps. An operation panel starting step for displaying the operation panel image on the display screen of the tablet terminal. An input operation step for selecting the operation buttons arranged on the operation panel image on the display screen of the tablet terminal. A step for outputting an input signal corresponding to the operation button selected in the input operation step by the input processing unit of the tablet terminal and wirelessly transmitting the input signal to the computer. A step for outputting the corresponding command signal by the signal processing unit of the computer based on the input signal wirelessly transmitted from the tablet terminal, and transmitting the command signal to the NC device. A step for causing the NC device to execute the driving operation of the corresponding part of the machine tool according to the command signal transmitted from the computer.

Through the above steps, for the operation panel image displayed by the tablet terminal, only by executing the input operation selecting the operation button indicating a predetermined operational function, the input signal outputted in response to the operation button is converted to the command signal in the computer and transmitted to the NC device. Based on the transmitted command signal, the NC device is capable of executing the operation of the corresponding part of the machine tool as with when the command signal is generated by pushing the corresponding operation button of the real operation panel of the past NC control panel.

At least an emergency stop button is required as a function displayed on the operation panel image. In addition, it is preferable to provide a cycle start button to start a cycle of an NC program, a feed hold button to stop the NC program, and a mode change-over button to switch between a manual operation mode and automatic operation mode. It is desirable to provide some program function buttons, coolant buttons, and auxiliary function buttons as buttons to changeover the enable/disable of various functions.

In the input operations to the operation buttons of the operation panel image, it is desirable to confirm whether the input is valid. As the confirmation mechanism, the tablet terminal may further include software to change a color tone display of each operation button between the enabled state and disabled state based on the input operation to each operation button arranged on the operation panel image.

In the past NC control panel, new inputs of various NC data such as programs required for NC program operations, parameters, and tool information are usually performed using a USB memory via a USB port provided to the NC control panel. Instead of this, the inputs are possible via the computer that transmits signals to and from the NC device by the transmission unit in the machine tool operation system of the present invention. In this case, input unit may be provided to enable inputs of NC data to the computer. For example, it is convenient to use a USB port previously provided to the computer.

The tablet terminal in the present invention can use a popular tablet computer, i.e., one whose plate-like body incorporates a computer body and which has a liquid crystal display as display unit and touch panel type input unit.

As wireless communication unit between the tablet terminal and computer, wireless LAN connection is preferred. For example, when the tablet terminal can use Wi-Fi and a Wi-Fi router is attached to the computer, a wireless LAN can be easily configured.

The operation panel image displayed on the tablet terminal does not necessarily indicate all the functions operable on the real operation panel of the NC control panel. It is also possible for the machine tool operation system of the present invention to provide a separate compact operation panel connected to the NC device via an I/O device, use this operation panel together with the tablet terminal, and divide the operable functions between the panel and the tablet terminal. With this configuration, even when the operation panel image displayable on the tablet terminal is smaller than the real operation panel of the NC control panel to limit the number of operation buttons arranged on the operation panel image, other operational functions can be provided to the compact operation panel in a complementary manner. Not only some direct operations using such a compact operation panel but also direct operations using a wirelessly connected handy manual pulse generator are applicable.

Advantageous Effects of the Invention

As above, in the present invention, the tablet terminal is substantially connected to the NC device via the computer that processes signals wirelessly inputted from the tablet terminal and outputs command signals to operate the machine tool. The machine tool is thus operable only by executing input operations on the tablet terminal from any location, for example, while the status of the machine tool is directly confirmed. This achieves more effective operations than before.

The display unit of the tablet terminal in the present invention includes the function that displays the operation panel image indicating at least a part of the operational functions previously provided to the NC device on the display screen. The input unit of the tablet terminal includes the function that transmits the input signal of the operational function selected from the display of the operation panel image to the computer. The computer includes the function that outputs the command signal to the NC device to operate the machine tool based on the input signal from the tablet terminal. The operator can thus easily operate the machine tool by inputting operations to the operation panel image on the display screen of the tablet terminal.

BRIEF DESCRIPTION OF DRAWINGS

FIG. 3 are diagrams showing examples of a display screen of a tablet terminal forming the machine tool operation system of the present invention.

DESCRIPTION OF EMBODIMENTS

Figure 1:
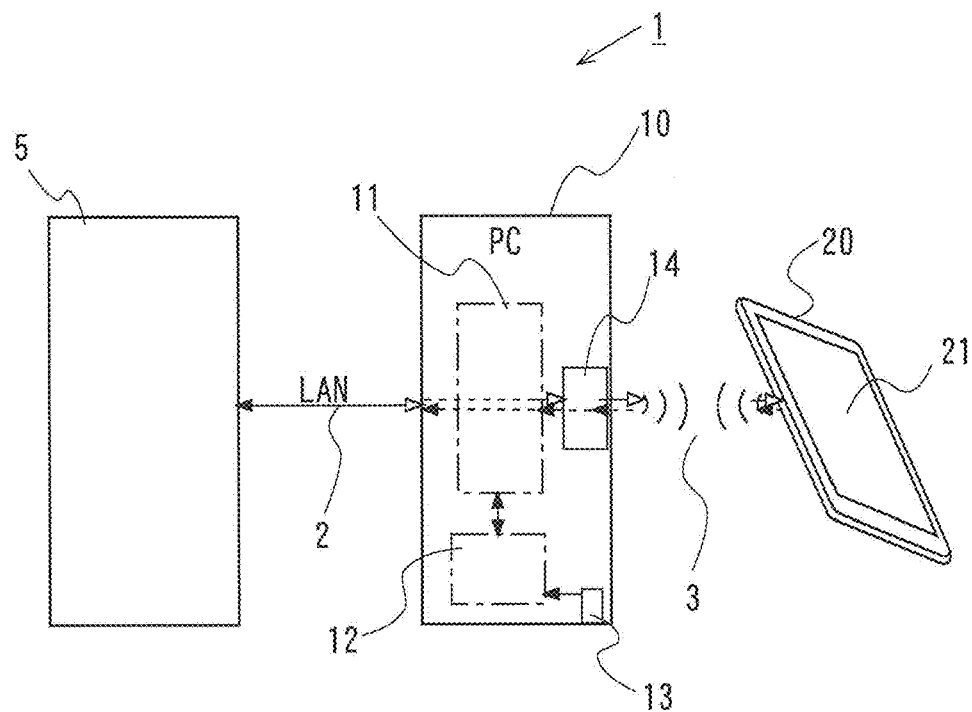
FIG. 1 is a schematic diagram of a machine tool operation system of one embodiment of the present invention.
Figure 2:
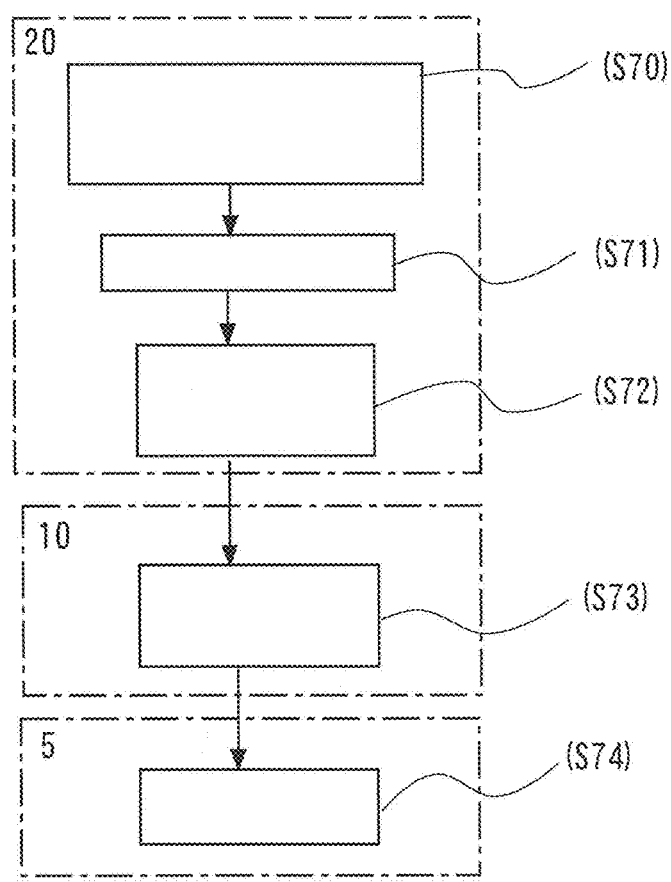
FIG. 2 is a flowchart showing operating steps of the machine tool operation system of FIG. 1.
Figure 3A:
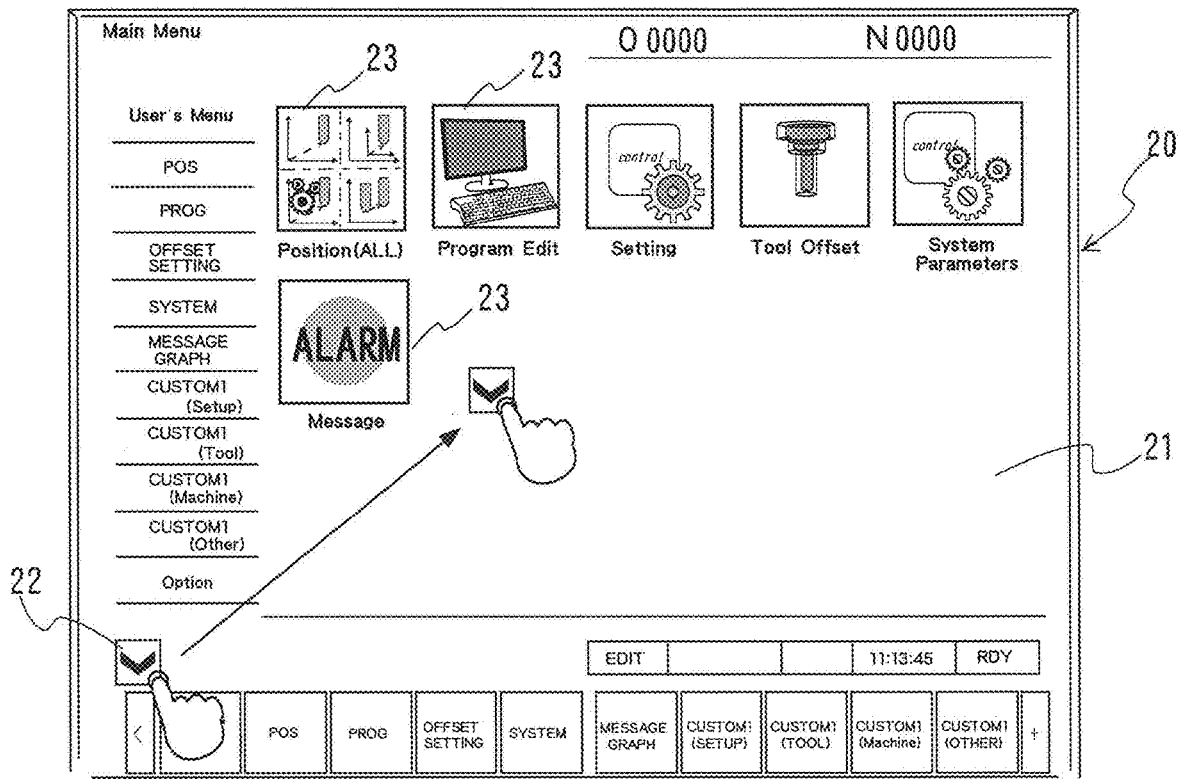
FIG. 3(a) is a menu screen before an operation panel image is displayed.
Figure 3B:
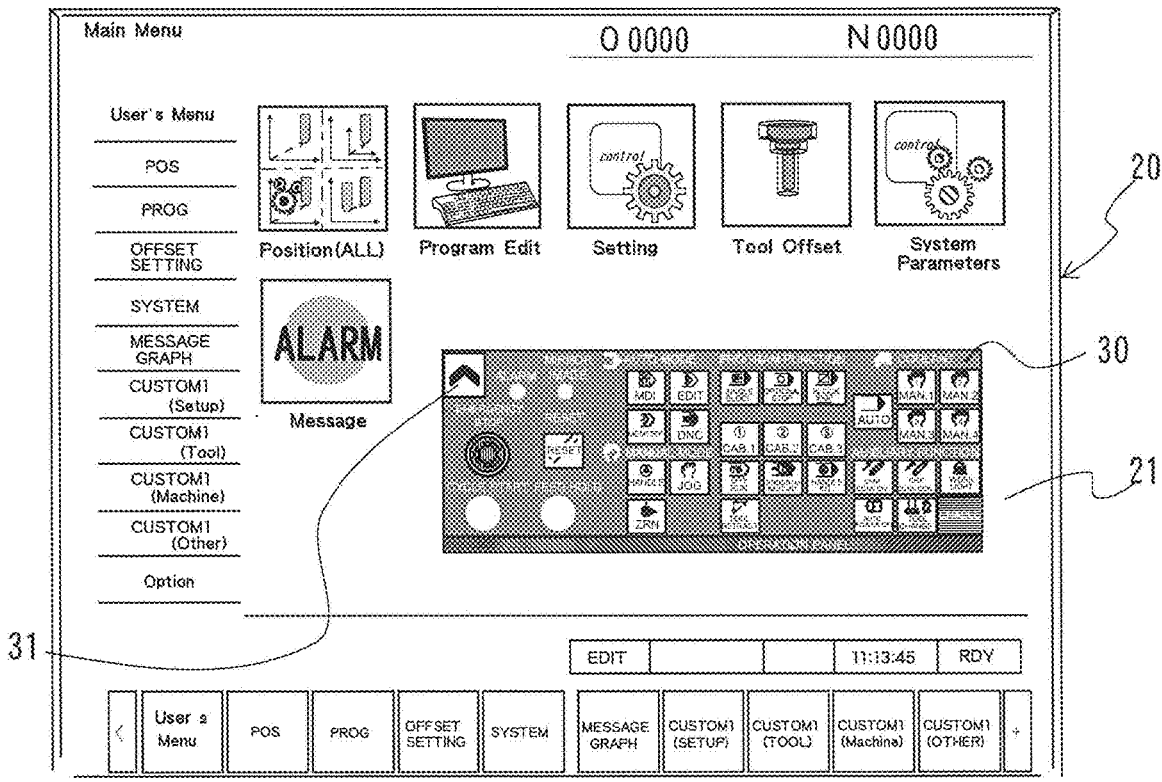
FIG. 3(b) is the display screen in a state where the operation panel image is displayed on the menu screen.
Figure 4:
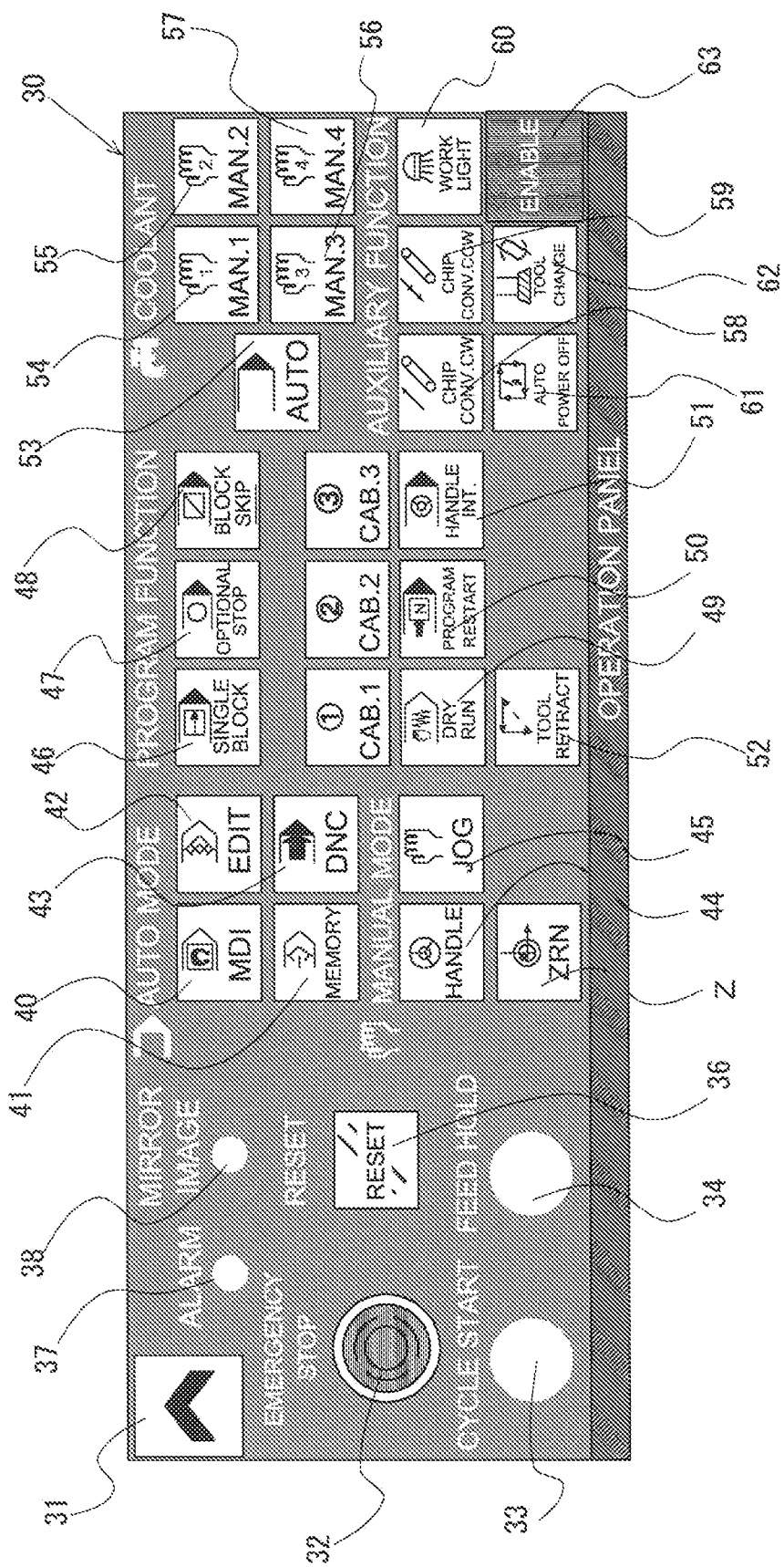
FIG. 4 is an enlarged view of the operation panel image displayed on the display screen of FIG. 3.

FIGS. 1 to 4 show a machine tool operation system of one embodiment of the present invention. FIG. 1 shows a schematic configuration of the entirety of the present machine tool operation system. FIG. 2 shows a flow of operating steps in the present operation system. FIG. 3 are diagrams showing a display screen of a tablet terminal. FIG. 4 is an enlarged view of an operation panel image displayed on a tablet terminal.

Entire Configuration

A machine tool operation system 1 of the present embodiment includes an NC device 5 connected to a machine tool body (not illustrated), a computer 10 connected to the NC device 5 by a LAN cable 2 as the transmission unit, and a touch panel tablet terminal 20 in communication with the computer 10 by a wireless LAN connection 3 as the wireless communication unit using a Wi-Fi router 14. The computer 10 incorporated in the system 1 may use a commercially available personal computer of, e.g., Windows (registered trademark) OS. And later, the computer 10 incorporated in the system is also called the incorporated PC 10.

Tablet Terminal

A touch panel liquid crystal display 21 of the tablet terminal 20 at startup displays a menu screen showing selectably various operation modes for the machine tool that are previously provided to the NC device 5, as icons 23. Operation panel application software is installed to the tablet terminal 20. The operation panel application software has a function of displaying an operation panel image 30 indicating a part of various machine tool operating functions previously provided to the NC device 5 on the menu screen and enabling touch input.

That is, when the screen of the liquid crystal display 21 of the tablet terminal 20 displays a menu screen in FIG. 3(a), a downward arrow button 22 for application startup is displayed on the lower left of the screen. The downward arrow button 22 is movable to any position on the screen while being pushed by the finger. When the downward arrow button 22 is touched while being fixed in position, the operation panel image 30 is started and displayed on the screen.

When an upward arrow button 31 that appears on the upper left of the operation panel image 30 is pushed, the operation panel image 30 disappears and the display of only the downward arrow button 22 returns. The operation panel image 30 is also set to be movable to any position on the screen while the area other than the various operation buttons is pushed by the finger.

Operation Panel Image

The operation buttons corresponding to the various machine tool operating functions are arranged on the operation panel image 30. In the operation panel application software, an input signal corresponding to each operation button is set. Signal processing software corresponding to the operation panel application software on the tablet terminal 20 is installed to the incorporated PC 10. A storage section 12 stores each code to command an execution of the operational function for the machine tool indicated by the operation button corresponding to each input signal. The signal processing software reads a command code corresponding to an input signal from the tablet terminal 20 from the storage section 12 to output the command code as a command signal in the signal processing section 11. New NC data can be also input into the incorporated PC 10 from a USB memory via a USB port 13. The NC device 5 can use the inputted NC data via the incorporated PC 10.

In the present embodiment, the functions capable of operating the machine tool in response to inputs from the tablet terminal 20 correspond to various operation buttons arranged on the operation panel image 30 in FIG. 4. The operation buttons are set to change in color by the operation panel application software in order to confirm that the operation buttons are changed from the disabled state to the enabled state. For example, the disabled state appears in white, in order to avoid malfunction grey appears, and the enabled state appears in other colors.

Similarly to the arrangement of a real operation panel of a past NC control panel, as the operation buttons arranged on the operation panel image 30, an emergency stop button 32, a cycle start button 33, a feed hold button 34, and a reset button 36 are arranged on the area toward the left end on the panel. An ENABLE button 63 is arranged on the lower right on the panel. When the ENABLE button 63 is pushed, some operation buttons enter the enabled state to function. When pushed, this button will illuminate in yellow for a fixed time.

When the emergency stop button 32 is pushed in order to change to the enabled state, it appears in red. The cycle start button 33 that starts a cycle of an NC program operation will illuminate in green during a cycle start. To prevent malfunction, the cycle start button 33 in gray does not function. Only when it turns white after the ENABLE button 63 is pushed, the cycle start button 33 can be in the enabled state. After pushed, the feed hold button 34 that stops the NC program during automatic operation will illuminate in yellow during feed hold.

Above the left end area on the panel, an alarm lamp 37 and a mirror image lamp 38 are arranged. When the alarm is generated the alarm lamp 37 will blink yellow. The mirror image lamp 38 illuminates when a mirror image is formed on each axis. it will illuminate in green when the mirror image is enabled.

In the left area near the center of on the panel, mode change-over buttons are arranged to change the operating modes of the machine tool between the automatic operation mode and manual operation mode. As to the automatic operation modes, an MDI operation mode button 40, a memory operation mode button 41, an edit mode button 42, and a DNC operation mode button 43 are arranged. As to the manual operation modes, a handle feed mode button 44, a jog feed mode button 45, and a homing mode button Z are arranged. Only the buttons of the selected modes will illuminate in yellow.

In the right area near the center of the panel, program function buttons are arranged to change-over the enabled/disabled states of the functions of the program. For example, a single block button 46 to stop the command of the block under execution after execution when turned ON during automatic operation, an optional stop button 47 to temporarily stop the automatic operation (coolant and a main shaft are stopped) at the block when turned ON during the program, and a block skip button 48 to disregard the command of the block including "/" (slash) on the NC program when turned ON, are arranged on the upper side in this area. Each button will illuminate in yellow in the enabled state.

Below these buttons, program function buttons are arranged to operate the functions of the program. For example, a dry run button 49 that disregards the feedrate commanded by the program and operates the machine at the feedrate set by a jog feedrate setting switch when turned ON, a program restart function button 50, a handle interruption button 51, and a tool retraction/return function button 52 are arranged. These buttons will illuminate in yellow during operation, but do not function in the gray state to avoid malfunction. And these buttons can function only when they turn white after the ENABLE button 63 is pushed.

In the area toward the right end on the panel, coolant buttons are arranged on the upper side to change-over the enabled/disabled states of the functions of the coolant. That is, an automatic cutting fluid supply button 53 and first to fourth cutting fluid units ON buttons (54, 55, 56, 57) are arranged. These operation buttons will illuminate in yellow in the enabled states.

Below these coolant buttons, auxiliary function buttons are arranged to change-over the enabled/disabled states of auxiliary functions. Specifically, this arrangement includes a chip conveyor start button 58 that starts and stops a chip conveyor, a chip conveyor reverse start button 59 that reverses (retreats) the chip conveyor while being pushed, a work light button 60 that turns ON/OFF a work light, an automatic power shutdown button 61 that change-over the enabled/disabled states of an automatic power shutdown function, and a manual tool exchange button 62. These auxiliary function buttons will illuminate in yellow in the enabled state.

Incorporated PC

The incorporated PC 10 previously stores, to the storage section 12, the command codes respectively corresponding to the operation buttons displayed on the operation panel image 30 to drive and operate the machine tool. Based on an input signal wirelessly transmitted from the tablet terminal 20, the signal processing section 11, using the signal processing software, reads a command code corresponding to the input signal from the storage section 12, outputs the read code as a command signal, and transmits the command signal to the NC device 5.

Machine Tool Operating Process

In the machine tool operation system 1 of the present embodiment including the above configuration, the operations of the machine tool using input operations from the tablet terminal 20 are executed through the following processes as shown in FIG. 2.

First, in the tablet terminal 20, as an operation panel starting (: operation panel application start, operation panel image display) step (S70), in the state where the display screen of the tablet terminal 20 displays the menu screen, the downward arrow button 22 on the menu screen is pushed to start and display the operation panel image 30.

Next, as an input operation (: touch panel input) step (S71), the operation button corresponding to the driving operation to be executed by the machine tool at the present time is pushed among the operation buttons corresponding to the various operation functions arranged on the operation panel image 30.

Then, as an input processing (: tablet terminal signal processing, input signal outputting) step (S72), the position signal of the operation button pushed at the previous input operation step (S71) detected on the touch panel is processed and the corresponding input signal is outputted and wirelessly transmitted to the incorporated PC 10.

Next, as an input signal processing (: PC input signal processing, command signal outputting) step (S73), the incorporated PC 10, based on the input signal wirelessly transmitted from the tablet terminal 20, makes the signal processing section 11 read the command code corresponding to the input signal from the command codes stored in the storage section 12 and outputs the read command code as a command signal by the signal processing software. The incorporated PC 10 transmits this command signal to the NC device 5.

And as command signal execution step (S74), the NC device 5 operates the corresponding part of the machine tool based on the received command signal. Through the above steps, the operation commanded using the touch operation input to the panel operation image 30 on the display screen of the tablet terminal 20 is executed in the real machine tool.

A Specific Example of Operations by the Operator

A specific example of operations by the operator is as follows. The example described below concerns the operator's operation for inputting on the tablet terminal 20 to drive the discharge of cutting fluid from a main shaft lateral cutting fluid supply nozzle of the machine tool. During the automatic or manual operation of the machine tool, the operator first performs a startup operation so that the operation panel image 30 is displayed on the menu screen currently displayed on the tablet terminal 20 (S70). Next, the operator pushes a first cutting fluid manual ON button 54 as an input operation to indicate the operational function that turns ON/OFF the supply of cutting fluid from the main shaft lateral cutting fluid nozzle among the coolant buttons of the operation panel image 30 displayed on the display screen of the tablet terminal 20 (S71).

When the first cutting fluid manual ON button 54 is pushed, by the operation panel application software, the input signal corresponding to the position signal of the button 54 detected on the touch panel is outputted and transmitted to the incorporated PC 10 (S72). After being pushed, the button 54 will illuminate in yellow.

In the incorporated PC 10, based on the input signal wirelessly transmitted from the tablet terminal 20, the signal processing section 11 reads, from the storage section 12, the command code corresponding to the input signal to command discharge of cutting fluid from the main shaft lateral cutting fluid nozzle. The command code is transmitted from the incorporated PC 10 to the NC device 5 (S73) as a command signal.

The NC device 5 that has received the command signal makes the main shaft lateral cutting fluid nozzle of the machine tool discharge cutting fluid based on the command signal (S74). To stop the discharge of this cutting fluid, the first cutting fluid manual ON button 54 is pushed again to OFF (S71). Then, an input signal to disable the previous input signal that enables the commanded function is outputted from the tablet terminal 20 and also wirelessly transmitted to the PC 10 (S72).

The incorporated PC 10 outputs a command signal for disablement based on the input signal for disablement and transmits the command signal to the NC device 5 (S73). The NC device 5 stops the discharge of the cutting fluid from the main shaft lateral cutting fluid nozzle according to the received command signal for disablement (S74).

The ON/OFF operation command made by pushing the first cutting fluid manual ON button 54 of the operation panel image 30 on the screen of the tablet terminal 20 is equivalent to the ON/OFF operation command made by pushing a first cutting fluid manual ON switch 132 arranged on the real operation panel 102 of the past NC control panel 100.

The operation buttons displayed on the operation panel image 30 in the above embodiment indicate some operating functions arranged on the real operation panel 102 of the actual NC control panel 100. It is not necessary for the operation panel image 30 to cover all the operating functions usually provided to the real operation panel 102. The operation panel image 30 does not include manual operational functions to move each axis in the jog feed mode in the manual operation mode, such as a jog feedrate setting switch 113, a rapid traverse override switch 114, and a jog feed (+) (−) direction switch 136.

The operating functions displayed on the operation panel image 30 can be inputted using ON/OFF of the operation buttons. In the real operation panel of the past NC control panel 100, the axis moving operation of the jog feed mode had been performed by rotating a dial. It is preferable for the operation equivalent to such a dial operation to use dial type input means.

Figure 5:
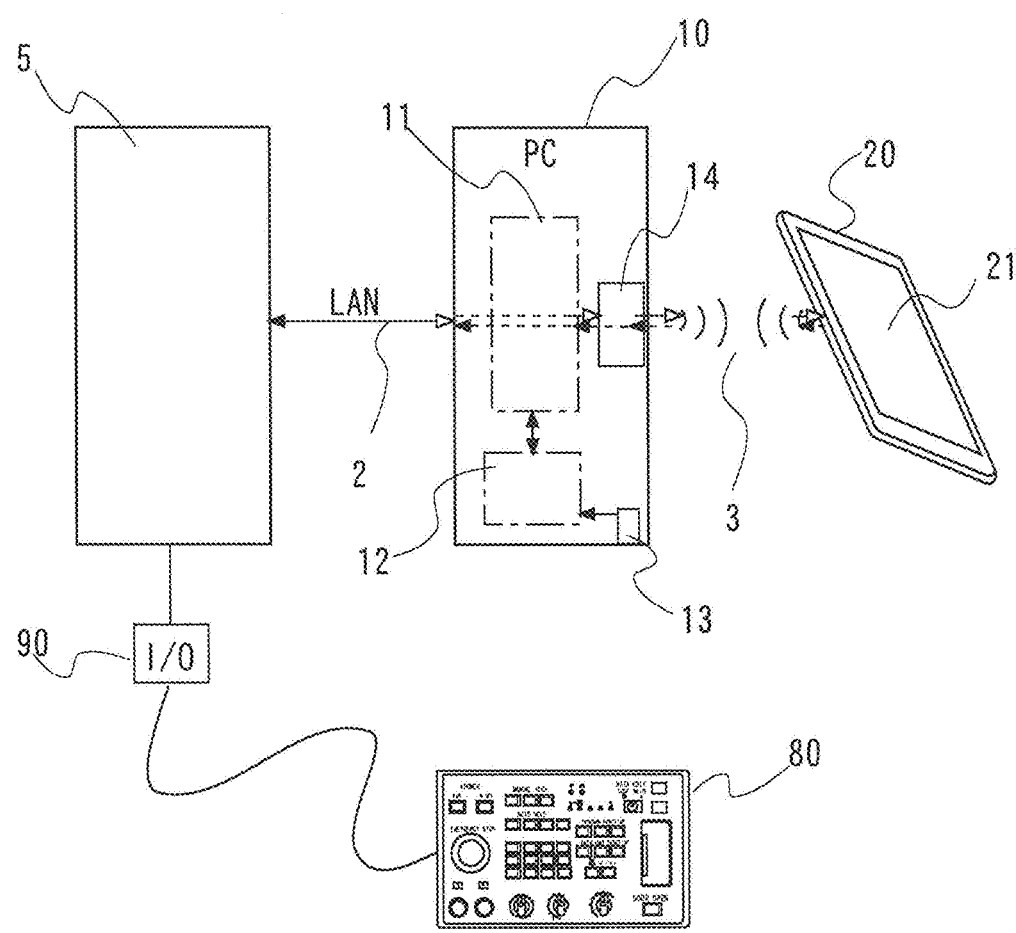
FIG. 5 is a schematic diagram of a machine tool operation system as a modification of the embodiment of FIG. 1.
Figure 6:
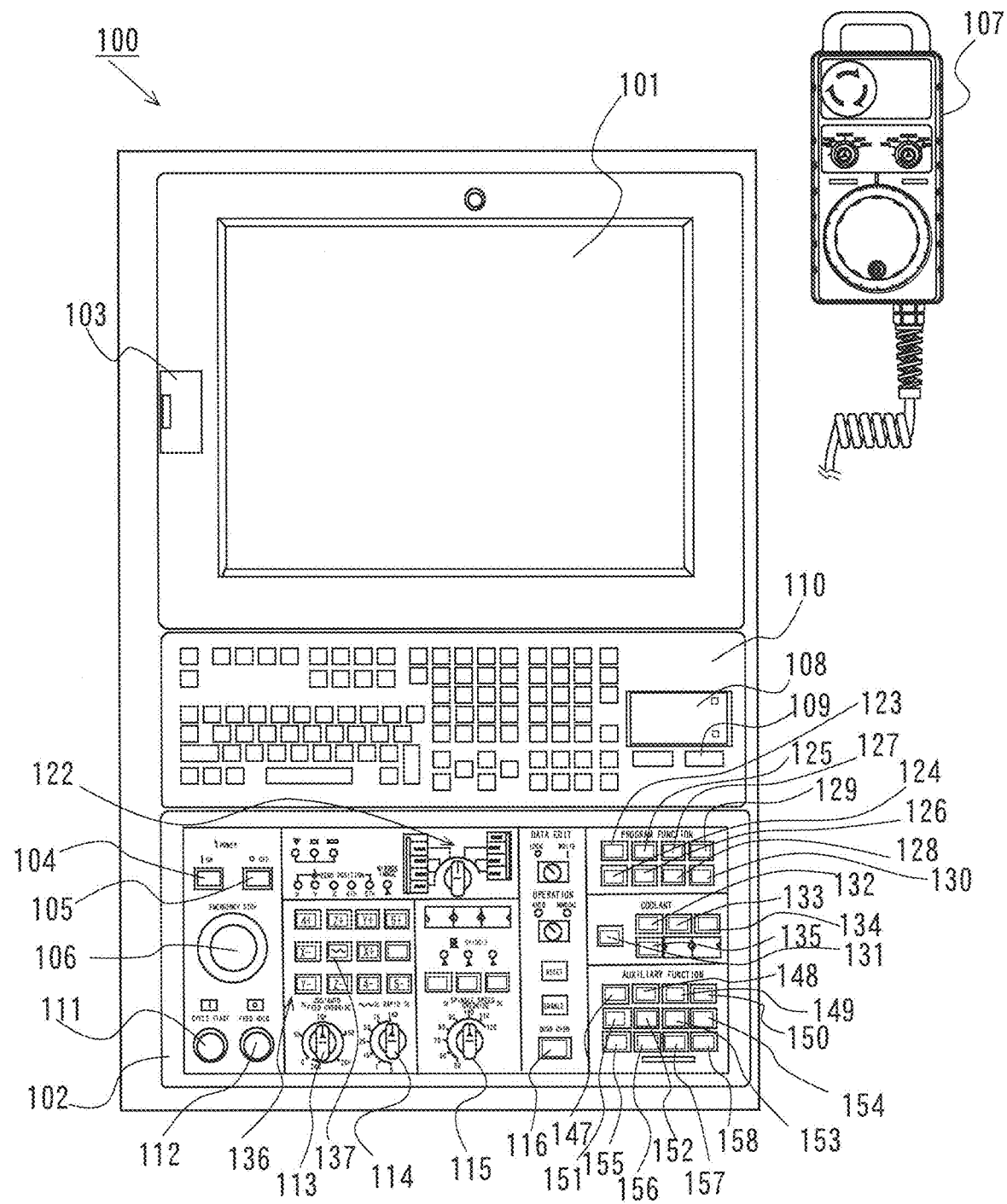
FIG. 6 is a schematic front view showing a configuration of a past NC control panel.

Accordingly, the other operational functions not displayed on the operation panel image 30, such as the operations generally inputted using the dial type, are mounted on a separately provided compact operation panel 80 as shown in FIG. 5 and incorporated in the present system via an I/O device 90. This makes it possible to supplement the other operational functions. It is also possible to use the handy manual pulse generator 107 wirelessly connected to the NC device 5.

That is, in this system configuration, the tablet terminal 10, compact operation panel 80, handy manual pulse generator 107 are used together to divide the operational functions for the machine tool. In this case, the functions that require the input operations exceeding the processing capacity of the tablet terminal may freeze during operation depending on the specification of the used tablet terminal 10, such as a long push of a button, are omitted on the operation panel image 30 to reduce load. This ensures that the operation system will constantly have smooth input operations.

The functions displayed on the operation panel image 30 are not limited to the types of the above embodiment. Multiple types of operation panel images may be provided to display different combinations of operational functions that can be appropriately selected and used.

REFERENCE SIGNS LIST

1: machine tool operation system
2: LAN cable
3: wireless LAN connection
5: NC device
10: incorporated PC
11: signal processing section
12: storage section
13: USB port
14: Wi-Fi router
20: tablet terminal
21: liquid crystal display (touch panel type)
22: downward arrow button 23: icon
31: upward arrow button
30: operation panel image
80: compact operation panel
90: I/O device
100: NC control panel
101: liquid crystal display
102: (real) operation panel
107: handy manual pulse generator

The invention claimed is:

1. A machine tool operation system comprising:
numerical control (NC) device connected to a machine tool body to perform numerical control;
a computer connected to the NC device; and
a tablet terminal in wirelessly communication with the computer to enable input and output of signals to and from the NC device via the computer,
wherein the tablet terminal includes, a display unit configured to display a menu screen showing selectable various operation modes for a machine tool, on a display screen, the various operation modes being previously provided to the NC device; an input unit to receive inputs of a user; and an input processing unit to output an input signal to be transmitted to the computer based on the input received by the input unit,
the computer includes a signal processing unit to output a command signal for a machine tool operation, the command signal being transmitted to the NC device based on the input signal from the tablet terminal;
wherein the machine tool operation system further comprises a wireless communication unit to wirelessly send and receive signals between the tablet terminal and the computer, and
a transmission unit to transmit signals between the computer and the NC device,
the tablet terminal further includes software having a function to make the display unit display, on the display screen, an operation panel image on which a plurality of operation buttons are arranged corresponding to at least some executions of various machine tool operational functions previously provided to the NC device and, based on an input operation selecting the operation button of the operation panel image, to make the input unit output an input signal corresponding to the operation button,
the computer includes
a storage section previously storing each command code corresponding to each operation button arranged on the operation panel image, the command codes being for machine tool operations, and
software having a function to make the signal processing unit read the command code for the corresponding machine tool operation from the storage section based on the input signal wirelessly transmitted from the tablet terminal via the wireless communication unit, and output the command code as a command signal to transmit the command signal to the NC device via the transmission unit, and
the display unit of the tablet terminal is configured to display a menu screen showing selectable various operation modes as icons and a button for starting and displaying the operation panel image.

2. The machine tool operation system according to claim 1 wherein
the NC device includes software having a function to transmit a status signal indicating an operational status of a machine tool to the computer via the transmission unit,
the computer includes software having a function to make the signal processing unit output an image display signal based on the status signal transmitted from the NC device and wirelessly transmit the image display signal to the tablet terminal via the wireless communication unit, and
the tablet terminal includes software having a function to make the display unit display an image indicating the operational status of the machine tool on the display screen of the tablet terminal based on the image display signal wirelessly transmitted from the computer via the wireless communication unit.

3. The machine tool operation system according to claim 1 wherein
as the operation buttons arranged on the operation panel image, an emergency stop button, a cycle start button, a feed hold button and a reset button are arranged on an area toward a left end on the panel.

4. The machine tool operation system according to claim 1 wherein
the tablet terminal further includes software having a function to change a color tone display of each operation button between an enabled state and a disabled state according to an input operation to each operation button arranged on the operation panel image.

5. The machine tool operation system according to claim 1 wherein
the input unit of the tablet terminal includes a touch panel.

6. The machine tool operation system according to claim 1 wherein
the computer includes means to receive inputs of various NC data.

7. The machine tool operation system according to claim 3 comprising:
an operation panel starting step for displaying the operation panel image on the display screen of the tablet terminal;
an input operation step for selecting the operation buttons arranged on the operation panel image on the display screen of the tablet terminal;
a step for outputting an input signal corresponding to the operation button selected in the input operation step by the input processing unit of the tablet terminal and wirelessly transmitting the input signal to the computer;
a step for outputting the corresponding command signal by the signal processing unit of the computer based on the input signal wirelessly transmitted from the tablet terminal, and transmitting the command signal to the NC device; and
a step for causing the NC device to drive the corresponding part of the machine tool according to the command signal transmitted from the computer.

* * * * *